United States Patent [19]

Verner

[11] Patent Number: 4,806,988

[45] Date of Patent: Feb. 21, 1989

[54] PROCESS AND AN ARRANGEMENT FOR THE AUTOMATIC FOCUSING IN A PHOTOGRAPHIC ENLARGING OR COPYING APPARATUS WITH A VARIABLE ENLARGING SCALE

[75] Inventor: Delueg Verner, Varna, Italy

[73] Assignee: Durst Phototecnik GmbH, Bozen, Italy

[21] Appl. No.: 88,893

[22] Filed: Aug. 24, 1987

[30] Foreign Application Priority Data

Aug. 29, 1986 [IT] Italy ................................. 4840 A/86

[51] Int. Cl.$^4$ .............................................. G03B 27/52
[52] U.S. Cl. ........................................ 355/55; 355/77
[58] Field of Search ................................... 355/55–59, 355/77; 354/400–402

[56] References Cited

U.S. PATENT DOCUMENTS

| | | | |
|---|---|---|---|
| 3,832,058 | 8/1974 | Gusovius | 355/56 |
| 4,585,338 | 4/1986 | Nitsch et al. | 355/56 |
| 4,647,190 | 3/1987 | Nitsch et al. | 355/55 |

FOREIGN PATENT DOCUMENTS 1594653  8/1981  United Kingdom .

Primary Examiner—Richard A. Wintercorn
Attorney, Agent, or Firm—Cahill, Sutton & Thomas

[57] ABSTRACT

According to the focusing process of the invention, in a calibrating stage, a number of focusing positions is stored that are assigned to varying enlarging ratios. In the stage of the automatic focusing, the focusing position for an arbitrary enlarging ratio is computed by interpolation from the stored position values.

The arrangement for carrying-out the process comprises memory means for the storing of the position values furnished by the position detectors for the frame holding means and the lens system support, as well as computing means for computing the focusing position for an arbitrary enlarging ratio by means of interpolation from previously stored focusing positions with respect to selected enlarging ratios.

17 Claims, 2 Drawing Sheets

PROCESS AND AN ARRANGEMENT FOR THE AUTOMATIC FOCUSING IN A PHOTOGRAPHIC ENLARGING OR COPYING APPARATUS WITH A VARIABLE ENLARGING SCALE

BACKGROUND OF THE INVENTION

The invention relates to a process and an arrangement for the automatic focusing in a photographic enlarging or copying apparatus with a variable enlarging scale.

Known enlarging apparatuses comprise a plane for receiving the copying material, particularly photographic paper; a lens system support for supporting a selected enlarging lens; as well as a frame holding means for receiving a film original to be copied. The lens system support and the frame holding means are parts of a projecting head by means of which the film original is projected onto the copying material. In order that the lens draws a sharp image of the original in the copying plane, the following well-known relationships must be satisfied for the distances between the level of the lens and the level of the original and between the level of the lens and the copying level:

$$a = \left(1 + \frac{1}{m}\right)f \quad (1)$$

$$b = (1 + m)f$$

$$c = \left(2 + m + \frac{1}{m}\right)f$$

with $c = a + b$ wherein a is the distance between the lens level and the level of the original; b is the distance between the lens level and the copying level; c is the distance between the copying level and the level of the original; m is the enlargement ratio; and f is the focal length of the used lens.

In the case of known enlarging apparatuses, the copying level is generally fixed, whereas the frame holding means and the lens system support are movable and can be adjusted in the direction of the optical axis of the lens. The setting of a desired enlarging ratio is made by adjusting the position of the projecting head of the enlarging apparatus relative to the fixed copying level; i.e., the distance c between the level of the original and the copying level is changed. For the focusing of the image corresponding to a set enlarging ratio, the lens must then be moved into the position for which the relationships (1) are met. For an automatic focusing device, the necessity therefore arises of determining for each setting the absolute position of the frame holding means as well as of the lens system support.

Electronic devices for the acquiring of such absolute position values are, for example, so-called digital rotary encoders, where a coding disk is coupled with the part whose position is to be acquired, and the position of the movable part is encoded by the angular position of the coding disk. If a high measuring resolution is required, the measuring and setting range of this system is limited, because the coding disk can contain only a limited number of codes. In any case, the manufacturing costs in the case of the application discussed here, where a high resolution is required over a relative large area, would be inadmissibly high.

From German patent publication No. DE-A 28 05 030, a process and an arrangement are known for the automatic focusing of a reproduction camera, where, for the detection of positions, incremental rotary encoders are provided. In this case, a sequence of electric pulses is generated by the movement of a rotary disk, and the distance to be moved, starting from a certain initial position, is determined by the counting of the emitted pulses. In order to keep the influence of possible errors during the counting of the occurring pulses as low as possible, and to obtain absolute position values, it is provided that the frame holding means and the lens system support means, at the start of each setting operation, are each moved into a reference position, to which a specific count value is assigned that characterizes the distance from the copying level. When a reference position is reached, the pertaining counting device, irrespective of the reached count, is reset to the counting value that is fixedly assigned to the reference position, whereby a reference value is set. After the selection of a desired enlarging ratio m and with the known focal length f of the lens, the focusing is then performed by calculating with a computing device the distance a and b on the basis of the above-mentioned relationships (1), and by using a motor-driven setting device move the frame holding means and the lens system support into the corresponding positions.

Although the use of an incremental measuring device is advantageous with respect to the costs and the achievable resolution, the fixed reference points on the moving paths of the frame and of the lens result in increased expenditures for detectors, such as microswitches or the like, for detecting these reference positions. The requirement of the precise positioning of the detectors also entails the risk of a possible instability in the course of time. Finally, the indicated process requires the knowledge or a preceding determination of the focal length of the used lens because it is based on the result of the calculation derived from the relationships (1).

SUMMARY OF THE INVENTION

The present invention is based on the objective of providing a process and an arrangement for automatic focusing that lead to precise and repeatable results, the device being easy to handle and reasonable with respect to manufacturing costs in comparison to known devices.

The process and the device according to the invention that achieve this objective determine the focusing position for an arbitrary enlarging ratio by interpolation between two focusing positions that were previously determined, corresponding to two given enlarging ratios, and stored in a memory device, the knowledge of the absolute position of the film original and of the lens unnecessary. The process and device of the present invention provide the further advantage that the measuring and positioning device do not have to operate with absolute precision, but only the repeatability of the measurement and the return precision of the positioning device must be ensured. In addition, there is no requirement for the lens parameters, particularly the focal length of the lens, to be known or determined in advance.

The storing of individual positions by means of the electronic storage of digitalized position values makes the initial calibration effortless and fast, even in cases where, in order to achieve a high focusing precision, a larger number of focusing positions must initially be stored within the enlarging range that is of interest.

Other characteristics and advantages of the process and the device according to the invention will be apparent from the following description of a preferred embodiment that will be explained by means of the attached drawings.

DETAILED DESCRIPTION OF THE PREFERRED EMBODIMENT

Figure 1:
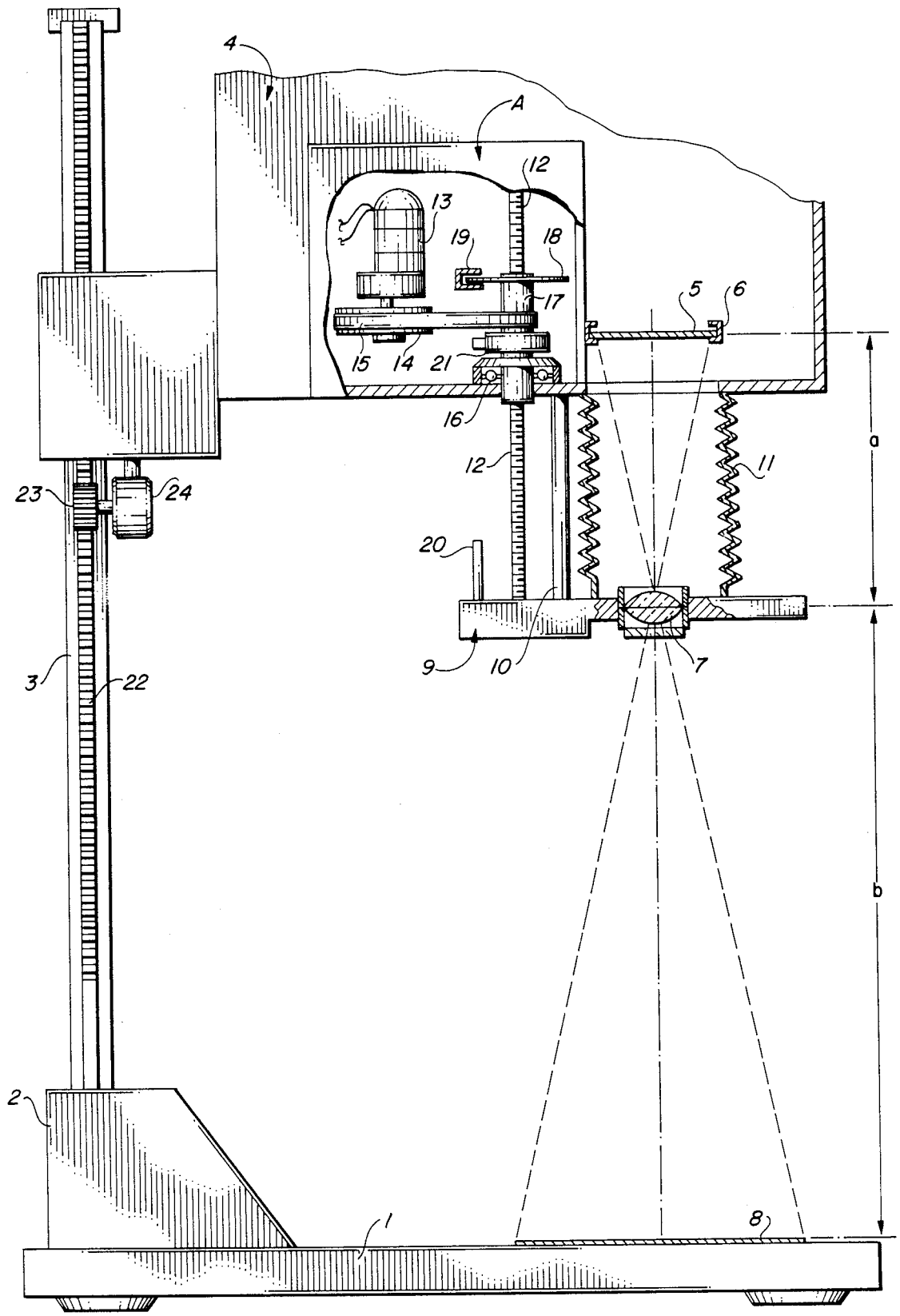
FIG. 1 is a diagrammatic representation of a photographic enlarging apparatus having a built-in automatic focusing device.

FIG. 1 shows a photographic enlarging apparatus in diagram form and limited to those parts that are necessary for an understanding of the focusing device. The enlarging apparatus comprises essentially a base board 1 on which, by means of a fastening means 2, a support column 3 is fastened as well as a projecting head 4 that is supported by the column and can be slid along it. The projecting head 4 contains a light source and light guiding means (both are not shown in the drawing) for lighting a film original 5 to be copied that is held in a frame 6, and by means of a lens 7, is imaged on the copying material 8. A lens system support 9, as the holding system or carrier for the lens 7, can be moved in guides 10 in the direction of the optical axis relative to the level of the frame. The light path, in the area between the original and the lens, is enclosed by bellows in a light-proof way. A threaded rod 12 that is firmly connected with the lens system support 9 and extends in parallel to the optical axis is part of a drive unit that is housed in a housing A fastened at the projecting head. The drive unit comprises an electric motor 13 having a pulley 14 that, via a belt 15, is coupled with a threaded bush 17. The threaded bush can be rotated in a roller bearing 16 that is fastened at the bottom of the housing A, and on its inside receives the threaded rod 12 in a flush way which, in this way, is shifted longitudinally by the rotating motion of the threaded bush. A disk 18 that is connected with the threaded bush in a torsionally fixed way, has a number of holes or gaps that are arranged on a concentric orbit and are aligned with an optical reading device 19, such as a photoelectric relay, so that, when the disk 18 is rotated, a sequence of electrical pulses is generated in correspondence with the passage of the individual holes or gaps through the active zone of the reading device.

For fixing a defined initial position that can be used as a reference for all other positions, the lens system support has a stop pin 20 that, at a given upper extreme position of the support, affects a stop ring 21 of the threaded bush 17 and blocks its rotating motion. By counting the pulses that were emitted by the optical reading device during the movement of the lens system support starting from the initial position, the instantaneous position of the support can be determined.

The stopping of the threaded bush 17 by simply striking the stop pin 20, without any friction effect or inertia effect, ensures a precise fixing of the initial position of the lens system support and its precise reproduceability.

For detecting the position of the projecting head 4 along the support column 3, the latter has a teething 22 that extends essentially over the whole length of the column. A toothed wheel 23 engages with it that is disposed on the shaft of a potentiometer 24 fastened at the projecting head 4. The use of this type of analog sensor to detect the position of the projecting head with respect to the position of the copying level is advantageous because of the fewer requirements exist with respect to the measuring resolution. In addition, advantages taken from the fact that conventional enlarging apparatuses are usually already equipped with this type of position detecting device for measurements in connection with the determination of the exposure values.

Figure 2:
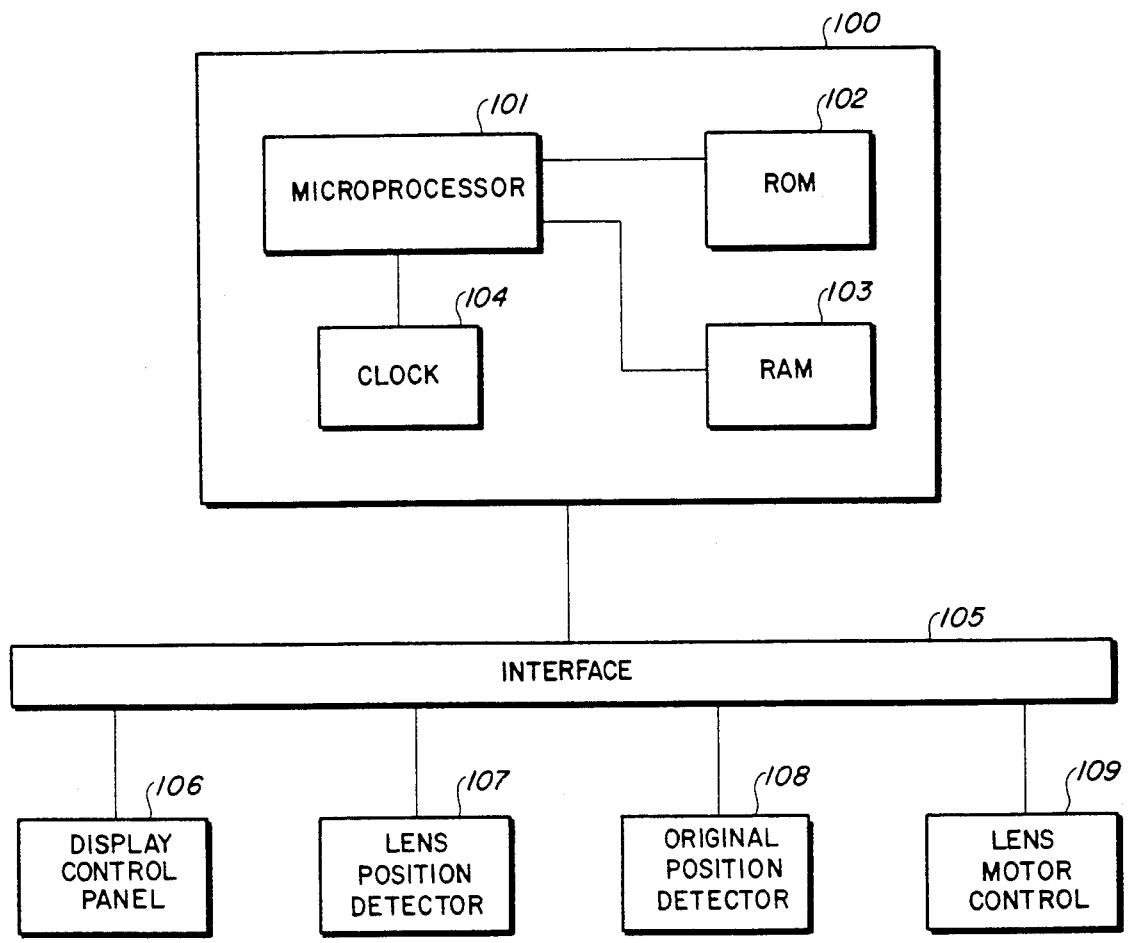
FIG. 2 is a block diagram of the circuit of the focusing device.

FIG. 2 is a block diagram of the circuit part of the focusing apparatus according to the invention. The core of the circuit is a microprocessor system 100 that comprises a microprocessor 101 with its peripheral elements, such as a read-only memory (ROM) 102, a random-access memory (RAM) 103 and a clock unit 104. Connected with the microprocessor via an interface 105 are a display and control panel 106, the position detector 107 for the lens level, the position detector 108 for the level of the original as well as the motor control 109 of the drive unit for the lens system support. With respect to the preceding description of the position detecting device, the output signal of the position detector 107 is the result of the counting of the pulses generated by the rotary disk 18 during its rotation, and the output signal of position detector 108 is the digitalized value of the voltage tapped at the measuring potentiometer 24 of the projecting head.

The computer is prepared in such a way that, for a given position of the frame, i.e., for a given enlarging ratio, it calculates the respective focusing position of the lens by interpolation between two previously determined and stored focusing positions pertaining to two given enlarging ratios. In practice, during a calibrating stage, a table of values is written into the memory 103 that represents the focusing positions for a discrete number of different enlarging ratios. In the operational stage, the position of the frame for an arbitrarily set enlarging ratio is then compared with the table and if it is identical with none of the stored positions, the respective focusing position of the lens is calculated by interpolation from the two closest positions of the table.

The mode of operation of the described device and its handling is as follows: By an actuating of the appropriate keys of the control panel 106, the device is set to calibrating operation and a start command is triggered. In response thereto, the motor 13 starts to move and first moves the lens system support into the initial position that is determined by the stop elements 20, 21 of the drive unit. At the moment of the stopping of the threaded bush 17 and thus of the lens system support, the pulse sequence emitted by the optical reading device ceases, from which a signal is obtained for the stopping of the motor and resetting of the pulse counting device. Thus, an initial count of the position detector 107 for the lens level is assigned to the initial position of the lens system support. The projecting head is then positioned, corresponding to an arbitrary enlarging ratio, for example, at the lower end of the available enlarging range. The image in the copying plane is focused manually, while the user observes the sharpness of the focus, by actuating the keys of a pair of keys of the motor control 109 in order to move the lens system support into one or the other direction until the focusing position is reached. Preferably, a special original with a suitable image structure is used in order to facilitate the judging of the image definition or of the degree of sharpness. After the precise focusing position has been found, the corresponding position values for the lens level and the level of the original furnished by the position detectors 107 and 108 are written into memory 103 by the actuating of a key of the control panel 106 that is provided for this purpose. Then the projecting head 4 is moved into another position that corresponds to a different enlarging ratio; the image, as described above, is focused again; and the position values for the lens and the original that correspond to the new position are stored. This process is continued for a number of projecting head positions for varying enlarging ratios until finally a table of values has been written into the memory 103 in pairs that represent fixed focusing positions for the levels of the lens and original within the whole intended enlarging range. The number of the focusing points to be stored depends on the required precision of the automatic focusing. Because of the simplicity of the operations to be carried out, the calibration is effortless and fast, even in the case of a large number of calibrating points.

If the enlarging apparatus is intended for working with different lenses, a calibration must take place for each of the lenses, whereby the respective calibration values are stored in separate memory channels. The calibration values remain permanently stored, and the enlarging apparatus is thus prepared for permanent automatic focusing. When working with the enlarging apparatus in practice, this takes place as follows:

At each startup of the enlarger, for example, when the apparatus is switched on, the lens system support 9 is first automatically moved into the initial reference position, and the pulse counter that is assigned to the optical reading device 19 is set to zero corresponding to this position. After the positioning of the projecting head 4 corresponding to a desired enlarging ratio, the microprocessor system 100, by means of the position detector 108, determines the pertaining position value and compares it with the values that are written into the stored table: If the position corresponds to one of the stored positions, the pertaining focusing position of the lens is also already located in the memory 103; if, on the other hand, the position of the projecting head 4 corresponds to none of the stored positions, but falls into the range between two of them, the computer calculates the focusing position of the lens from the values of the adjacent positions by interpolation. As soon as the value that is assigned to the focusing position has been determined, the motor control system 109 is automatically actuated in order to bring the lens system support 9 into the corresponding position that is identified by the position detector 107. The counting direction of the counting device assigned to the optical reading device 19 changes with the rotating direction of the motor 13 or with the polarity of its supply voltage so that the count at any time indicates the effective position of the lens system support 9. The device according to the invention therefore automatically carries out the focusing for any arbitrary enlarging ratio as for any adjustment of the projecting head 4, the lens system support 9 follows into the focusing position.

If a copying frame for the copying material is used, the image level frequently comes to be located at a level that differs from the base board 1 of the enlarging apparatus, so that the focusing plane must be changed corresponding to the height of the copying frame. In the device according to the invention, the displacement of the focusing plane for the adaptation to the height of different frames takes place by the appropriate correction of the measured values furnished by the position detector 108 of the projecting head 4. For this purpose, the distance between the image level and the base board level or the distance of the image level from the level with respect to which the calibration took place, is fed, by means of a corresponding input device of the control panel 106, into the microprocessor system 100, and this system corrects the value furnished by the position detector 108 by the same amount. In this way, the stored table of values maintains its validity, and a new calibration is not required. The fed-in shifting of the focus is advantageously shown on the display field 106.

Preferably, each focusing position is approached in one and the same moving direction of the lens system support 9, for example, in upward direction, in order to keep interfering effects of mechanical play as low as possible and to ensure sufficient repeatability of the setting positions. For this purpose, a certain focusing position, if it should be necessary, is first exceeded by a short distance in order to then approach it from the preferred side.

The zero balancing by the approach to the initial position of the lens system support 9 takes place automatically at each startup of the apparatus; in the course of the work, if required, a new balancing may be triggered by actuating a restart key of the control panel 106 that is provided for this purpose.

The calculating of the focusing positions preferably takes place by linear interpolation. With a corresponding design of the computer, the focusing characteristics can, however, be approached by more complex functions which entails a higher focusing precision with the same number of stored fixed points.

The process according to the invention and the device for its application are described with respect to an enlarging apparatus in which the level of the original can be moved with respect to a stationary copying level. However, they also apply to the case where the original remains in a fixed position and the copying level is movable. Finally, the described invention with corresponding adaptations can also be applied to a case in which both mentioned levels are fixed, and for achieving varying enlarging ratios, a lens with a variable focus (zoom) is used.

I claim:

1. A process for the automatic focusing in a photographic enlarging or copying apparatus with a variable enlarging scale, wherein
    in a calibrating stage, a number of different enlarging ratios are set successively, the corresponding respective focusing positions are found manually and their position values are stored,
    in the automatic focusing stage, the focusing position that is assigned to any arbitrary enlarging ratio is computed continuously by interpolation from the number of stored positions, and the determined position is approached in a motor-driven way.

2. A process according to claim 1, wherein the focusing positions are determined by linear interpolation from the number of stored positions.

3. A process according to claim 1, wherein the position values are acquired by means of an incremental sensor with respect to a defined initial position to which a fixed initial value of the sensor is assigned.

4. A process according to claim 3, wherein for the zeroing of the position measuring device, during the startup of the enlarging apparatus, the initial position is reached automatically and/or during the operation, is reached upon the corresponding command from the operator.

5. A process according to claim 1, wherein a determined focusing position is finally approached in a preferred moving direction.

6. An arrangement for automatically focusing a photographic enlarging or copying apparatus of the type having a movable lens system for providing a variable enlarging scale, said arrangement comprising in combination:
 a. a base including means for supporting copying material;
 b. a projecting head for supporting and lighting a film original to be copied;
 c. head support means for supporting the projecting head at a variable distance from the base to provide variable enlarging ratios;
 d. first detector means for detecting the position of the projecting head relative to the base and generating a first signal in response thereto;
 e. lens support means for supporting a movable lens at a variable distance from the projecting head;
 f. a motor drive unit coupled to the lens support means for varying the position of the lens support means and the movable lens supported thereby;
 g. second detector means for detecting the position of the lens supporting means relative to the projecting head and generating a second signal in response thereto;
 h. a computer electrically coupled to the motor drive unit and to the first and second detector means;
 i. a memory electrically coupled to the computer for storing paired values of the first and second signals generated by the first and second detector means, respectively; and
 k. control means coupled to the computer and having a calibrating mode and an operating mode, the calibrating mode of said control means allowing a user to manually actuate the motor drive unit to move the lens support means until a focused image of the film original is obtained for a plurality of enlarging ratios, said control means including means for signalling the computer that proper focus has been manually obtained in order to store in the memory the values of the first and second signals generated by the first and second detector means, respectively, for each of the selected plurality of enlarging ratios, the automatic mode of said control means causing the computer to respond to the first signal generated by the first detector means by comparing the first signal to the values of the first signal stored in the memory during the calibrating mode and to compute a calculated focusing position for the lens support means based upon the two closest first signal values stored in the memory by interpolation, the motor drive unit being responsive to the calculated focusing position for automatically moving the lens support means and movable lens to a focused position.

7. An arrangement according to claim 6, wherein the memory and computer are parts of a microprocessor system.

8. An arrangement according to claim 7, wherein the projecting head includes a frame holding means wherein said first and second detecting means convert each position of the frame holding means and of the lens support means into a digital numerical value corresponding to the respective positions thereof.

9. An arrangement according to claim 8, wherein the second detector means has a rotary disk with several reference symbols that is dynamically coupled with the lens support means as well as a detector and counting device for the reference symbols during the rotation of the disk.

10. An arrangement according to claim 9, wherein the reference symbols on the rotary disk are holes or gaps that are arranged in the shape of a circular curve, and the detector and counting device comprises an optical reading device.

11. An arrangement according to claim 8, wherein the rotary disk is fixed on a threaded bush that can be rotated in a plane that is fixed relative to the frame holding means and receives a threaded rod that with one end is fastened at the lens support means.

12. An arrangement according to claim 11, wherein the lens support means can be adjusted relative to the frame holding means that is coupled with the threaded bush.

13. An arrangement according to claim 12, wherein the lens support means includes a stop element, and wherein the threaded bush includes a complimentary stop element, and wherein a predetermined end position of the lens support means is fixed by means of the engagement of the stop element of the lens support means with the complimentary stop element of the threaded bush.

14. An arrangement according to claim 9, wherein the counting direction of the counting device is determined by the polarity of the supply voltage applied to the motor drive unit.

15. A process for the automatic focusing of a photographic enlarging or copying apparatus having a variable enlarging scale, the photographic enlarging or copying apparatus including a movable support for a film original, a movable lens, a support for holding copying material at a copy level, and a motor drive unit for moving the movable lens, the process including the steps of:
 a. calibrating the apparatus by:
  (i) positioning the film original at an arbitrary distance from the copy level corresponding to an arbitrary enlarging ratio;
  (ii) manually operating the motor drive unit to move the lens to a focused position to form a sharp focused image at the copy level;
  (iii) detecting the relative position of the film original and generating a first signal indicative of the arbitrary enlarging ratio;
  (iv) detecting the relative position of the lens and generating a second signal indicative of the focused lens position for the aforementioned arbitrary enlarging ratio;
  (v) storing the first and second signals in a memory;
  (vi) repeating steps i–iv above for different enlarging ratios to build a table of position values in the memory; and
 b. automatically focusing the lens for any desired enlarging ratio by performing the steps of:
  (i) selecting a desired enlarging ratio by positioning the film original at any desired distance from the copy level;

(ii) detecting the relative position of the film original and generating a first signal indicative of the selected enlarging ratio;

(iii) comparing the first signal to the values of the first signal stored in the memory during the calibrating steps (a.i) through (a.v);

(iv) computing a focusing position for the desired enlarging ratio by interpolation from the stored focusing positions corresponding to the stored enlarging ratios defining a range in which the desired enlarging ratio lies; and (v) operating the motor drive unit under the control of the computed focusing position to automatically move the lens to a focused position.

16. A process according to claim 15, wherein the computed focusing position is determined by linear interpolation from the number of stored focusing positions.

17. A process according to claim 15, wherein the step of detecting the relative position of the lens includes the steps of moving the lens to a defined initial position to which a fixed initial value is assigned and thereafter moving the position of the lens to a focused lens position.

* * * * *